(12) United States Patent
Xia et al.

(10) Patent No.: US 8,195,046 B2
(45) Date of Patent: Jun. 5, 2012

(54) MEASUREMENT OF POLARIZATION MODE DISPERSION OR DIFFERENTIAL GROUP DELAY OF AN OPTICAL PATH

(75) Inventors: Tiejun J. Xia, Richardson, TX (US); Glenn A. Wellbrock, Wylie, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 358 days.

(21) Appl. No.: 12/637,208

(22) Filed: Dec. 14, 2009

(65) Prior Publication Data
US 2011/0142440 A1 Jun. 16, 2011

(51) Int. Cl.
*H04B 10/08* (2006.01)
*H04B 10/18* (2006.01)
*H04B 10/12* (2006.01)

(52) U.S. Cl. ............... 398/29; 398/147; 398/208

(58) Field of Classification Search ........... 398/28–29, 398/147–150, 208
See application file for complete search history.

(56) References Cited

U.S. PATENT DOCUMENTS 5,406,368 A * 4/1995 Horiuchi et al. ............ 356/73.1
2010/0135654 A1* 6/2010 Pincemin et al. ............ 398/25

* cited by examiner

*Primary Examiner* — Leslie Pascal

(57) ABSTRACT

A method may include generating first and second optical signals and modulating the first and second optical signals simultaneously to synchronize the signals. The method may include varying the polarization of the second optical signal and transmitting the first and second optical signals. The method may include receiving the first and second optical signals, wherein the signals traveled along a same optical path. The method may include determining a plurality of differential travel delays between the first and second optical signals over a period of varying polarizations and determining a differential group delay based on the maximum and the minimum differential travel delays.

22 Claims, 13 Drawing Sheets

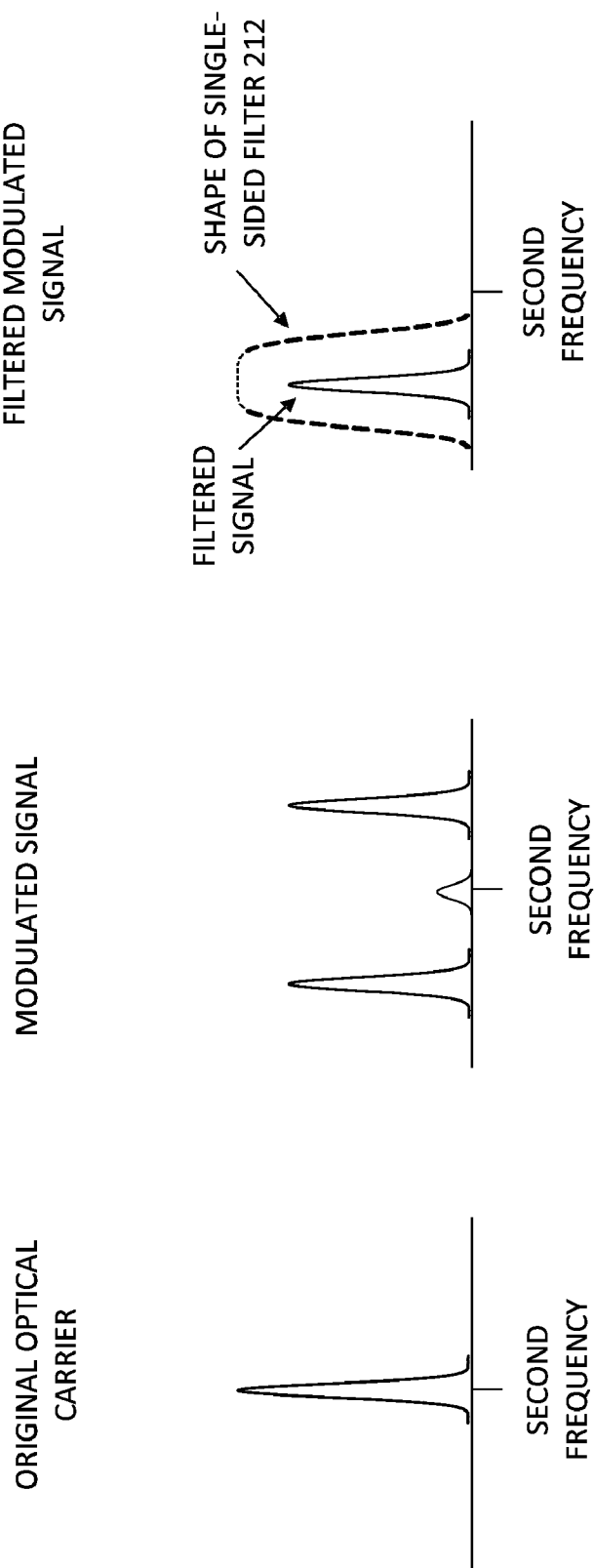

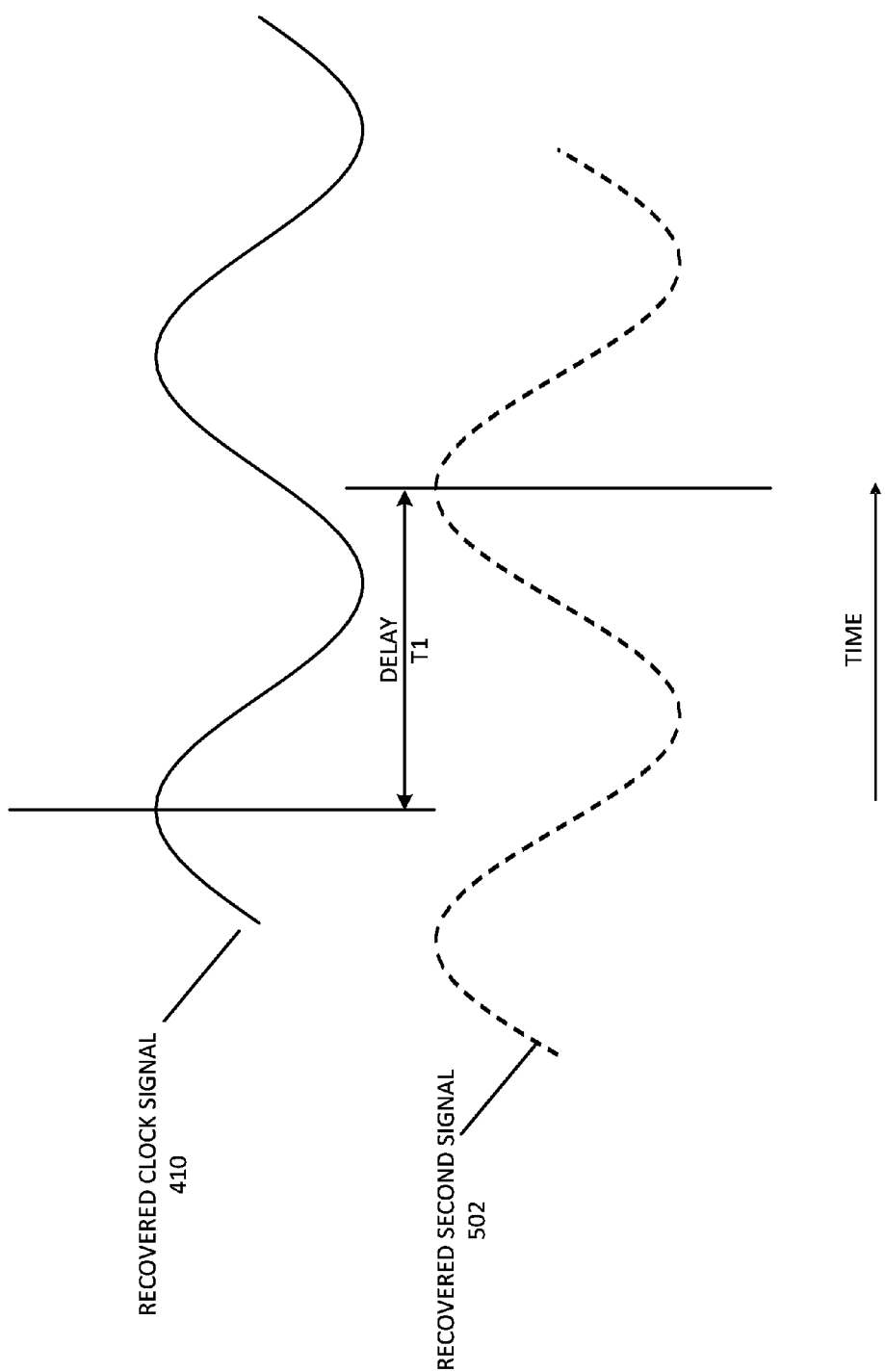

900

MEASUREMENT OF POLARIZATION MODE DISPERSION OR DIFFERENTIAL GROUP DELAY OF AN OPTICAL PATH

BACKGROUND INFORMATION

Businesses and individuals increasingly rely on computer networks for communications. For example, home users expect to receive television programming on-demand over digital networks. Businesses may rely on applications (e.g., database applications, mail server applications, word processing applications, etc.) provided over a network, such as the public Internet or a leased private network. As time passes, communication networks are expected to carry more data over some of the same communication paths in a more reliable manner. Increasingly the data paths are optical data paths, and the providers of the optical networks need to test these paths.

BRIEF DESCRIPTION OF THE DRAWINGS

FIGS. 3A, 3B, and 3C are frequency plots of exemplary optical signals generated in the test transmitter of FIGS. 2A and 2B;

FIGS. 5A and 5B are plots of exemplary optical signals received in the test receiver of FIGS. 4A and 4B;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Polarization mode dispersion (PMD) may impact the integrity of optical signals. PMD is a form of modal dispersion where two different polarizations of light in an optical path, which normally travel at the same speed, travel at different speeds causing the spreading of the optical signal. PMD effects may cause an optical signal to have different travel speeds based on polarization and frequency. PMD can be characterized by a series of parameters: a first-order PMD parameter or "differential group delay" ("DGD"); a second-order PMD parameter ("SOPMD"); a third-order PMD parameter ("TOPMD"); etc.

The measurement of PMD effects may become increasingly useful in Dense Wavelength Division Multiplexing (DWDM) optical networks (including networks employing mesh-based architectures). Further, the measurement of PMD effects may become increasingly useful for optical paths in deployed, in-service networks. One or more embodiments disclosed herein may measure PMD and/or DGD of an optical path in a deployed network, e.g., an in-service, operational network that may have already been installed in the field and may connect existing customer premises. Some embodiments described herein allow for the measurement of PMD of an optical fiber or path. In one embodiment, the first-order PMD parameter, or DGD, may be measured to indicate the PMD, because the DGD parameter may be more indicative of PMD than the other parameters.

Figure 1:
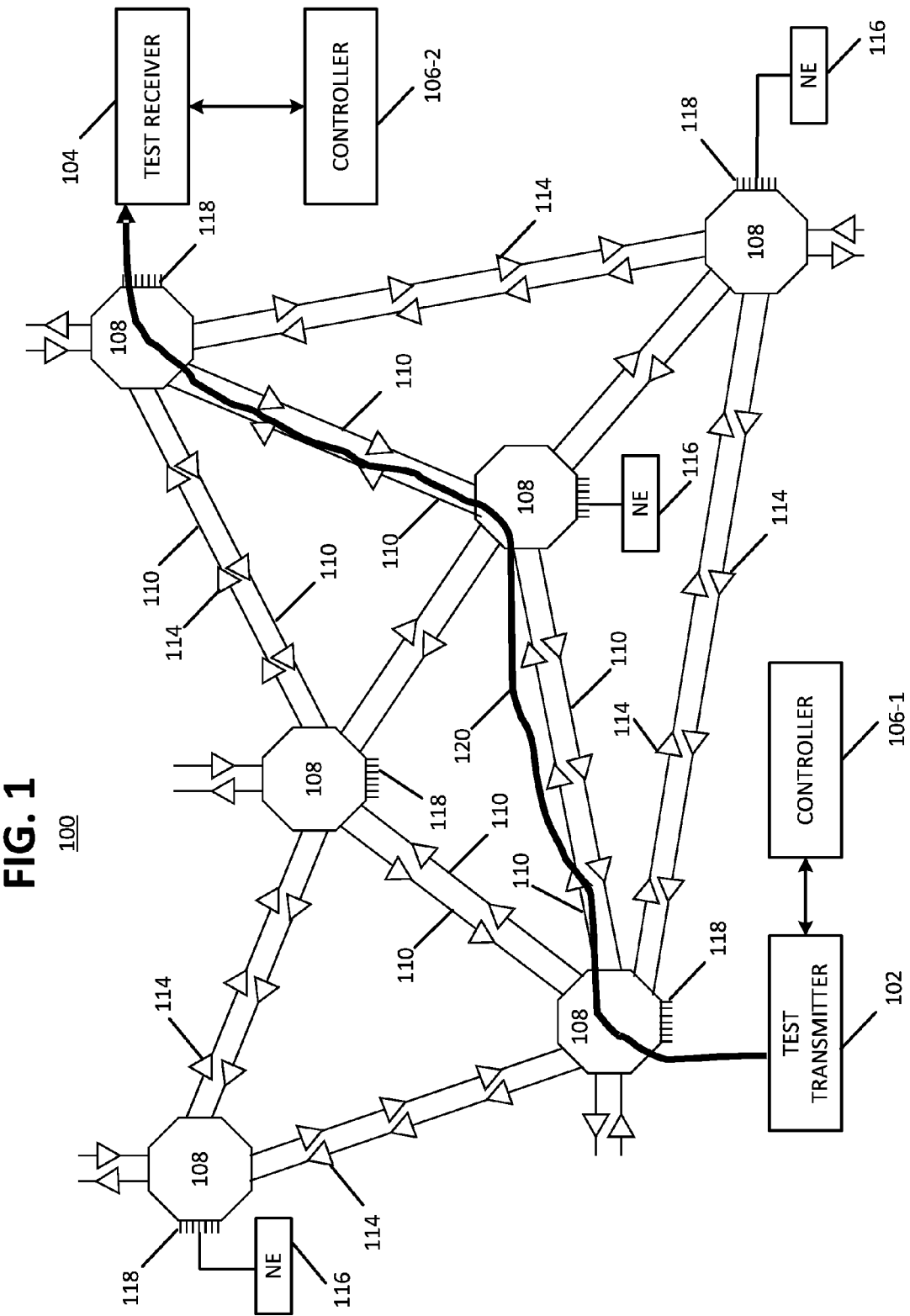
FIG. 1 is a diagram of an overview of an exemplary embodiment described herein.

FIG. 1 is a diagram of an overview of an exemplary embodiment in a network 100 for measuring PMD and/or DGD. Network 100 may include a deployed, in-service network. Network 100 may include test transmitter 102, test receiver 104, controllers 106 (individually, controller 106-1 and controller 106-2), reconfigurable optical add-drop multiplexers (ROADMs) 108, optical fibers 110, optical amplifiers 114, and network elements (NE) 116. Amplifiers 114, ROADMs 108, optic fibers 110, and NEs 116 are referred to individually as amplifier 114-x, ROADM 108-x, optic fiber 110-x, and NE 116-x, respectively.

Test transmitter 102 may transmit signals through fibers 110 along an optical path 120 to test receiver 104. As the signals travel along optical path 120, the signals may pass through multiple fiber lengths 110, multiple amplifiers 114, multiple ROADMs 108, etc., and may experience PMD and/or DGD effects along path 120. Test transmitter 102 is described in more detail with respect to FIGS. 2A and 2B.

Test receiver 104 may receive the signals transmitted from test transmitter 102 after the signals have passed through optical path 120. In one embodiment, analysis of the signal received by test receiver 104 may reveal a measurement of PMD and/or DGD of optical path 120. Test receiver 104 is described in more detail below with respect to FIGS. 4A and 4B.

Controllers 106 may include one or more computing modules for hosting programs, databases, and/or applications, such as an application to control test transmitter 102 and/or test receiver 104 for the measurement of PMD and/or DGD in an optical path.

Optical fiber 110-x may include a single length of fiber or may include multiple spans of fibers. A single length of fiber may include, for example, a 1,000 kilometer length of optical fiber. Multiple spans may include optical fibers strung together between optical amplifiers, ROADMs, and/or switches, such as amplifiers 114 and ROADMs 108.

Amplifier 114-x may amplify an optical signal in an optical path, such as optical path 120, without converting the signal into an electrical signal. ROADM 108-x may include a multiplexer that can add data to an optic fiber 110-x for transport to another network device. ROADM 108-x may include a group of ports 118 for receiving optical signals from network devices for adding to an optical fiber. Ports 118 may also be used for dropping signals from fiber 110-x to provide optical signals to network devices, such as NEs 116 or test receiver 104, for example. In one embodiment, each of ports 118 may correspond to a different channel and a different wavelength in a wavelength division multiplexing (WDM) network. ROADM 108-x may allow an optical signal to be added or dropped without converting the signal (or other signals on the fiber) to electronic (e.g., non-optical) signals.

NEs 116 may use network 100, including ROADMs 108, and amplifiers 114 for communicating with other NEs 116. For example, NE 116-x may reside in a neighborhood for providing residents' access to the Internet. NE 116-x may receive optical signals on a channel from ROADM 108-x that are intended for the particular NE 116-x. NE 116-x may also transmit an optical signal on a channel to ROADM 108-x that may be intended, for example, for a different NE 116-x in network 100. NE 116-x may include, or may be coupled to, computers (e.g., servers, desktop computers, and/or laptop computers), televisions, telephones, personal digital assistants (PDAs), routers, switches, or any other computational device that may receive and transmit data.

Exemplary network 100 may include more, fewer, or different devices than shown. For example, network 100 may include hundreds or thousands of NEs, fibers, ROADMs, amplifiers, and/or switches. Further, although FIG. 1 shows devices in a particular configuration, the devices may also be arranged in other configurations. For example, in one embodiment, ROADM 108-x may include test transmitter 102 and/or test receiver 104. In this embodiment, controllers 106 may remotely operate the test equipment (as a component of ROADM 308-x) and analyze the results. Further, network 100 may include a mesh network, the Internet, an ad hoc network, a local area network (LAN), a wide area network (WAN), a metropolitan area network (MAN), a high-speed fiber optic network (e.g., FiOS™), or any other network or combinations of networks.

Figure 2B:
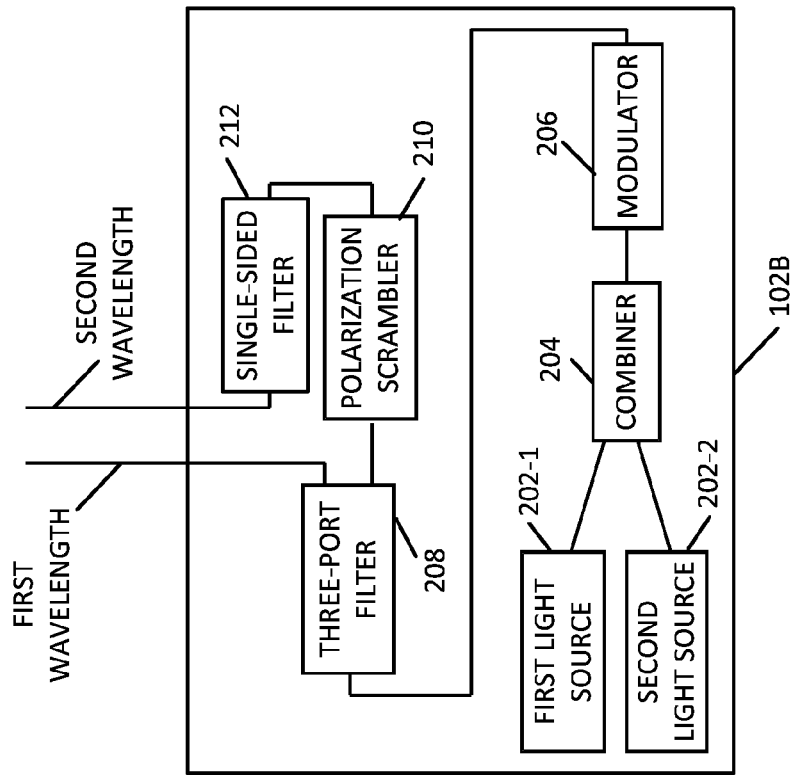
FIGS. 2A and 2B are block diagrams of exemplary components of a test transmitter.
Figure 2A:
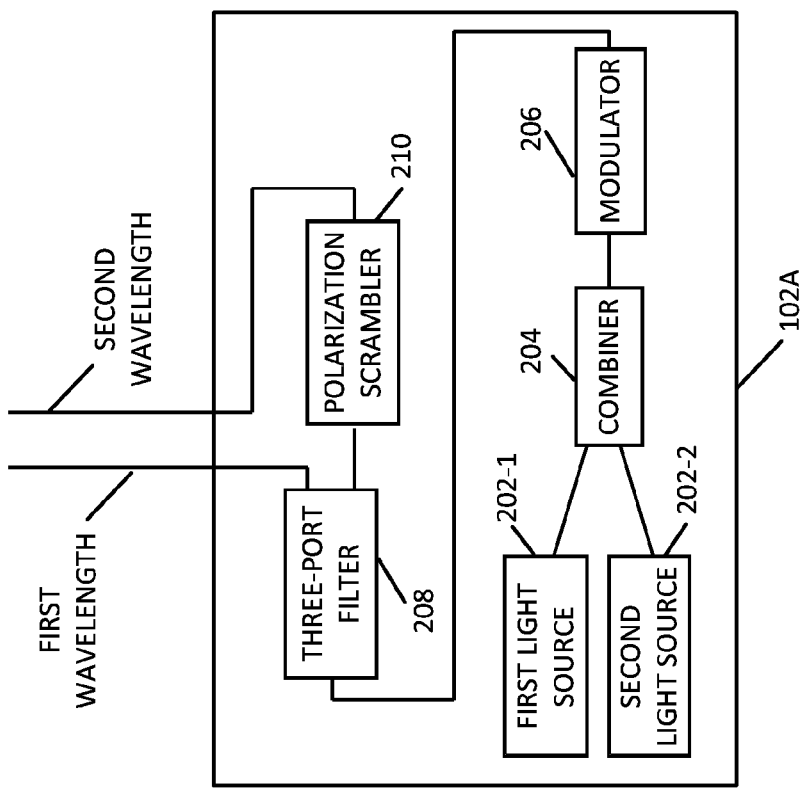

FIG. 2A is a block diagram of exemplary components of one embodiment of test transmitter 102 (hereinafter, "test transmitter 102A"). Test transmitter 102A may include a first light source 202-1 and a second light source 202-2 (collectively, "light sources 202"), a signal combiner 204, a modulator 206, a three-port filter 208, and a polarization scrambler 210.

First light source 202-1 may output a wavelength of light tuned to match an open channel in an optical path, such as an open channel in network 100 in optical path 120. Likewise, second light source 202-2 may also output a wavelength of light tuned to match an open channel in an optical path, such as an open channel in network 100 in optical path 120. In one embodiment, the wavelength and frequency of light output by second light source 202-2 (the "second signal" output at a "second wavelength" and a "second frequency") may be chosen to be different than the wavelength and frequency of light output by first light source 202-1 (the "first signal" output at a "first wavelength" and a "first frequency"). In one embodiment, light sources 202 may include a laser or a filtered ASE (amplified stimulated emission).

Combiner 204 may receive the light from the first light source 202-1 and the light from the second light source 202-2 and may combine the light into a single fiber, for example. Combiner 204 may output the combined signal (including both the first and second signal at the first and second wavelength, respectively) on a single optical fiber.

Modulator 206 may input the combined signal and may modulate the combined signal to generate two synchronized signals (e.g., two optical clock signals, one at the first wavelength and one at the second wavelength). In this embodiment, because modulator 206 operates on both the first and second signals simultaneously, the first and second signals are synchronized (e.g., the two optical clocks are synchronized). In one embodiment, the modulation frequency may be between 1 to 10 GHz (e.g., 2.5 GHz). In one embodiment, modulator 206 may employ amplitude and/or phase modulation, for example.

Three-port filter 208 may input the two synchronized signals (e.g., the first and second signals on a single fiber) and may output the first signal (e.g., at the first wavelength) to a port of ROADM 108-x corresponding to the appropriate wavelength and coupled to the optical path under test (e.g., path 120). Three-port filter 208 may also output the second signal (e.g., the second wavelength) to polarization scrambler 210.

Polarization scrambler 210 may change or vary the polarization of the received optical signal. Polarization scrambler 210 may cycle through many different polarizations. In one embodiment polarization scrambler 210 may cycle through 8,000 polarizations described by three coordinates (e.g., a horizontal component, a vertical component, and an axial component relative to the fiber receiving the output of polarization scrambler 210). In one embodiment, polarization scrambler 210 changes polarization every time increment. Polarization scrambler 210 may output the second signal (e.g., the second wavelength) to a port of ROADM 108-x corresponding to the appropriate wavelength and coupled to the optical path under test (e.g., path 120).

Thus, test transmitter 102A may output two signals at two wavelengths. These two signals may include a well synchronized and may include two well synchronized clocks. One of the signals may include varying polarizations.

FIG. 2B is a block diagram of exemplary components of another embodiment of test transmitter 102 (hereinafter, "test transmitter 102B"). Test transmitter 102B may include a single-sided filter 212 in addition to light sources 202, signal combiner 204, modulator 206, three-port filter 208, and a polarization scrambler 210.

In this embodiment, single-sided filter 212 may be added to the output of polarization scrambler 210. FIGS. 3A through 3C are referred to for describing single-sided filter 212. As shown in FIG. 3A, second light source 202-2 may include a carrier at the second frequency. After the carrier is modulated by modulator 206, the modulated signal includes two sidebands centered about the second frequency. Polarization scrambler 210 acts on the modulated signal shown in FIG. 3B and, thus, without single-sided filter 212, the output signal would have the frequency characteristics shown in FIG. 3B. Because the optical path (e.g., optical path 120) may exhibit chromatic dispersion, the portion of the signal in one of the side bands may be delayed differently than the portion of the signal in the other side band even though both may have the same polarization. Thus, since the delay being measured includes the delay based on the different polarization, measuring accuracy may be increased by removing one of the side bands and/or the residual signal at the carrier frequency. Thus, in one embodiment, single-sided filter 212 passes only one side band of the modulated signal and may help remove the effects of chromatic dispersion when recovering the second signal. FIG. 3C illustrates an exemplary pass bandwidth (e.g., shape) of single-sided filter 212 and the frequency spectrum of the filtered modulated signal.

In one embodiment, controller 106-1 may control test transmitter 102. Controller 106-1 may turn on test transmitter 102, may program the polarizations to which polarization scrambler 210 can change a signal, may instruct the tuning of light sources 202, may vary three-port filter, etc. In another embodiment, the components of test transmitter 102 (e.g., polarization scrambler 210, three-port filter 208, etc.) may include a controller.

Figure 4A:
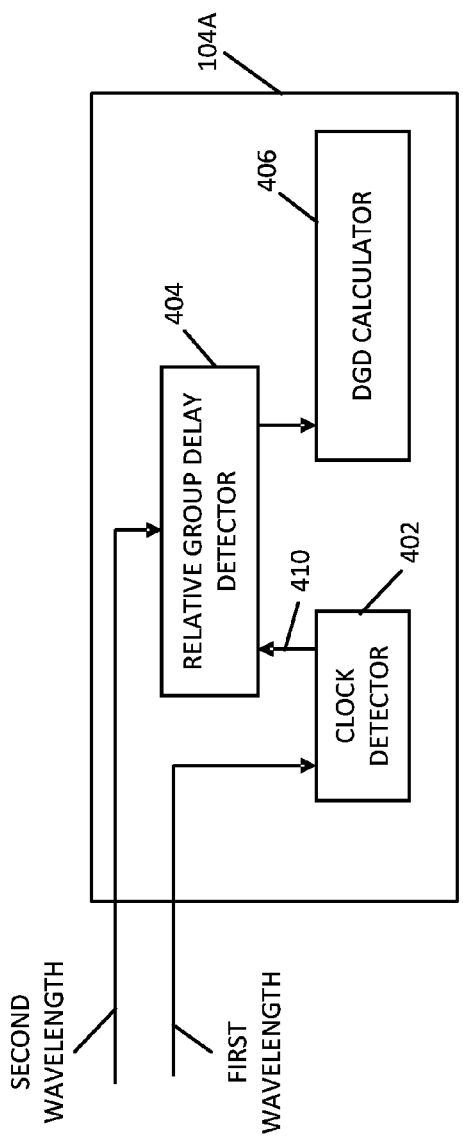
FIGS. 4A and 4B are block diagrams of exemplary components of a test receiver.

FIG. 4A is a block diagram of exemplary components of one embodiment of test receiver 104 (hereinafter, "test receiver 104A"). Test receiver 104A may include a clock detector 402, a relative group delay detector 404 (hereinafter, "RGD detector 404"), and a DGD calculator 406.

Clock detector 402 may detect the clock signal carried by the first signal at the first wavelength (e.g., the signal without the scrambled polarization). Clock detector 402 may output the detected clock as a clock signal 410 to RGD detector 404.

RGD detector 404 may measure the delay between clock signal 410 output from clock detector 402 (e.g., without scrambled polarization) and the recovered second signal (e.g., with scrambled polarization). RGD detector 404 is described with respect to FIG. 5A, which includes plots of exemplary signals received by test receiver 104A. As shown, recovered second signal 502 is delayed by delay time T1 relative to recovered clock signal 410. In this example, RGD detector 404 may output delay time T1 to DGD calculator 406. RGD detector 404 may measure the relative delay once every polarization time increment, for example. RGD detector 404 may measure the relative delay over a period of time such that polarization scrambler 210 cycles once through all polarizations for measurement. RGD detector 404 may output the measured delays as they are measured or as a group of delays.

In one embodiment, RGD detector 404 includes a clock detector to detect the clock signal carried by the second wavelength (e.g., the second signal). In this embodiment, a phase detector circuit may detect the phase difference between the first signal (e.g., first wavelength) and the second signal (e.g., second wavelength). In another embodiment, the relative delay may be detected indirectly without recovering the clock signal superimposed on (e.g., carried by) either the first signal or the second signal.

Figure 5B:
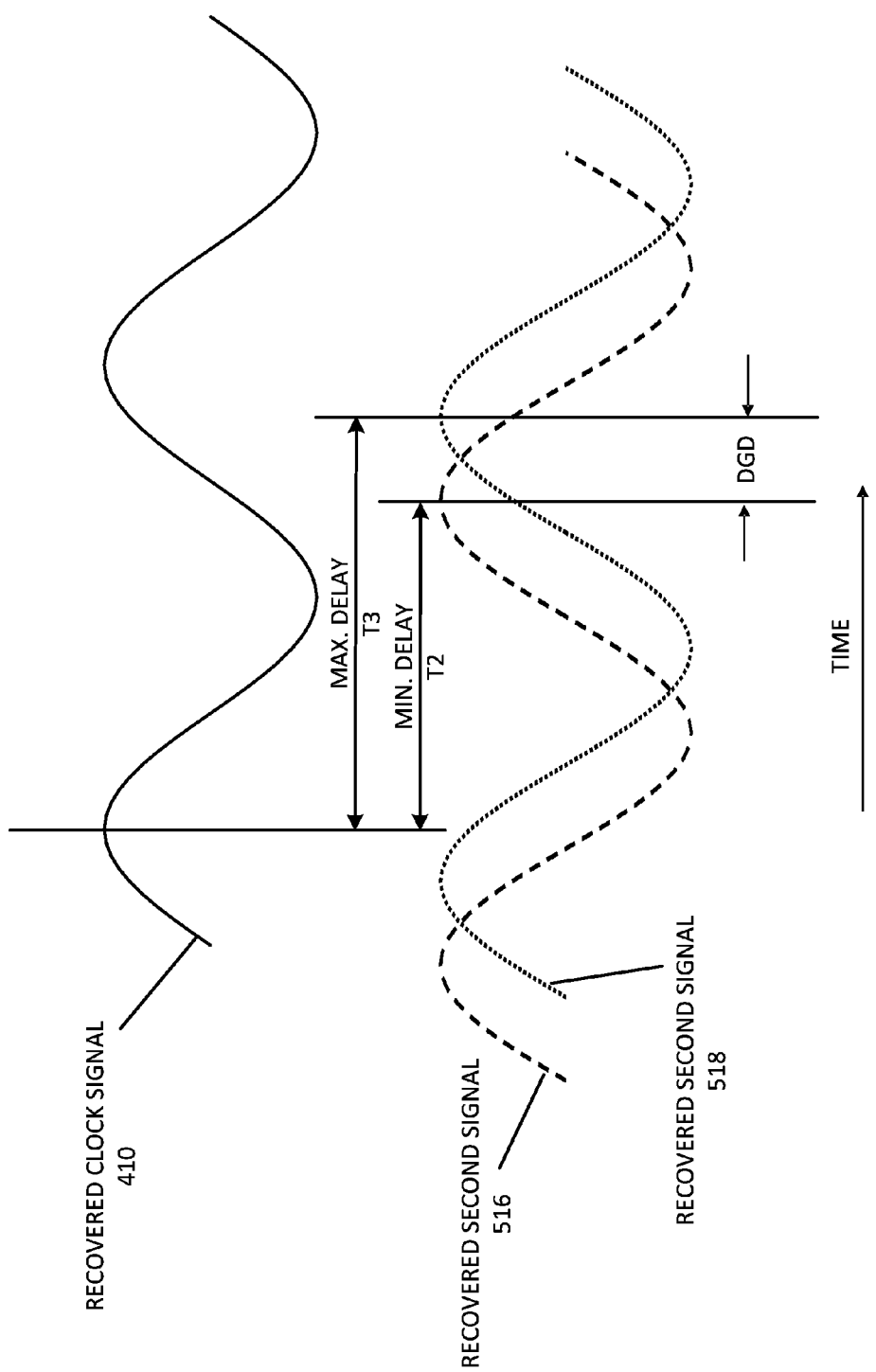

DGD calculator 406 receives the measured delays from RGD detector 404. DGD calculator 406 may determine the minimum and maximum delay values output from RGD detector 404 and may calculate the DGD value based on these minimum and maximum delay values. RGD detector 404 is described with respect to FIG. 5B, which includes plots of exemplary signals received by test receiver 104A. As shown in FIG. 5B, recovered second signal 516 is delayed by minimum delay time T2 relative to recovered clock signal 410. Further, at a different time, recovered second signal 518 is delayed by maximum delay time T3 relative to recovered clock signal 410. In this example, RGD detector 404 outputs delay time T3 and delay time T2, along with other delay values, to DGD calculator 406. DGD calculator 406 determines that maximum delay time T3 is the maximum value and that minimum delay T2 is the minimum delay. In one embodiment, DGD calculator 406 calculates the DGD value by subtracting the maximum delay from the minimum delay. In the current example, DGD calculator 406 may calculate the DGD value by subtracting minimum delay time T2 from maximum delay value T3.

In one embodiment, an indication or measurement of the PMD is given by the measurement of DGD. In this embodiment, DGD (e.g., the first-order PMD parameter) is indicative of the PMD because this first-order parameter may contribute more to PMD than the other, higher-order parameters.

If there is PMD and/or DGD in the optical path, then the arrival time of the second signal (e.g., with scrambled polarization) may exhibit a different delay relative to the first signal (e.g., without scrambled polarization) when the polarization of the second signal changes. In this case, DGD calculator 406 may determine the maximum delay time and the minimum delay time and output the difference between the two.

If there is no PMD and/or DGD in the measured optical path, then the arrival time of the second signal (e.g., with scrambled polarization) relative to the first signal (e.g., without scrambled polarization) does not change when the polarization of the second signal changes. In this case, DGD calculator 406 may determine that the PMD and/or DGD are zero (e.g., that the minimum delay and the maximum delay are the same, and the difference is zero).

In one embodiment, the accuracy of RGD detector 404 (assuming a duty cycle of 0.1%) may be 1 ps (picoseconds) for a modulation frequency of 1 GHz, 0.1 ps for a modulation frequency of 10 GHz, and 0.4 ps for a modulation frequency of 2.5 GHz. In this embodiment, the measurement range of DGD calculator 406 may be 1,000 ps for a modulation frequency of 10 GHz, 100 ps for a modulation frequency of 10 GHz, and 400 ps for a modulation frequency of 2.5 GHz.

Figure 4B:
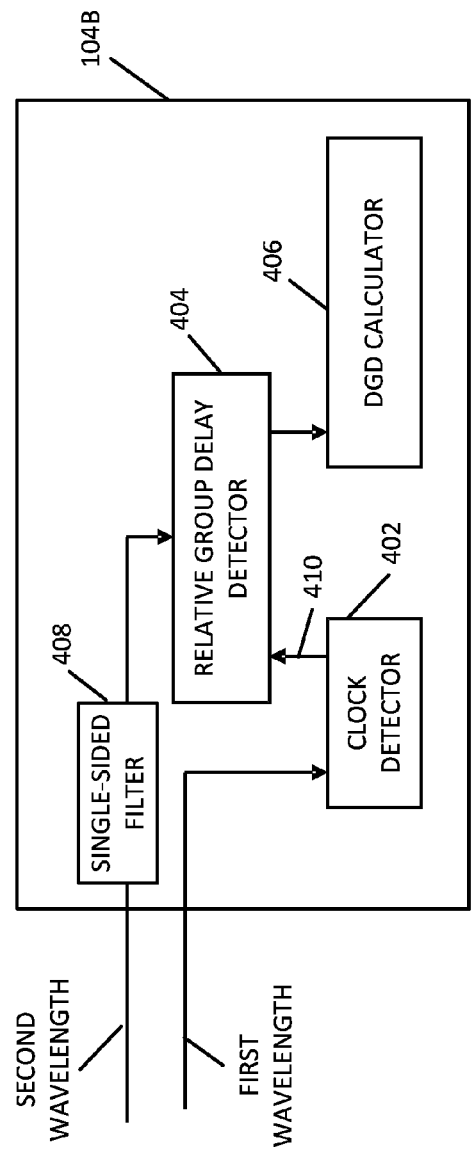

FIG. 4B is a block diagram of exemplary components of another embodiment of test receiver 104 (hereinafter, "test receiver 104B"). Test transmitter 104B may include a single-sided filter 408 in addition to clock detector 402, relative group delay detector 404, and DGD calculator 406.

In this embodiment, single-sided filter 408 may be added to the input of test receiver 104B. As described above with respect to FIGS. 2B, and 3A through 3C, and single-sided filter 212, the modulated second signal may include two sidebands centered about the second frequency. As an alternative to single-sided filter 212, a single-sided filter 408 may be placed in test receiver 104B rather than in test transmitter 102B. In this embodiment, single-sided filter 408 may reduce chromatic dispersion by passing only one sideband for the same reasons given above for single-sided filter 212.

In one embodiment, controller 106-2 may control test receiver 104. Controller 106-2 may turn on test receiver 104, may program DGD calculator 406, may change single-sided filter 408, etc. In another embodiment, the components of test receiver 104 (e.g., DGD calculator 406, etc.) may include a controller.

Figure 6:
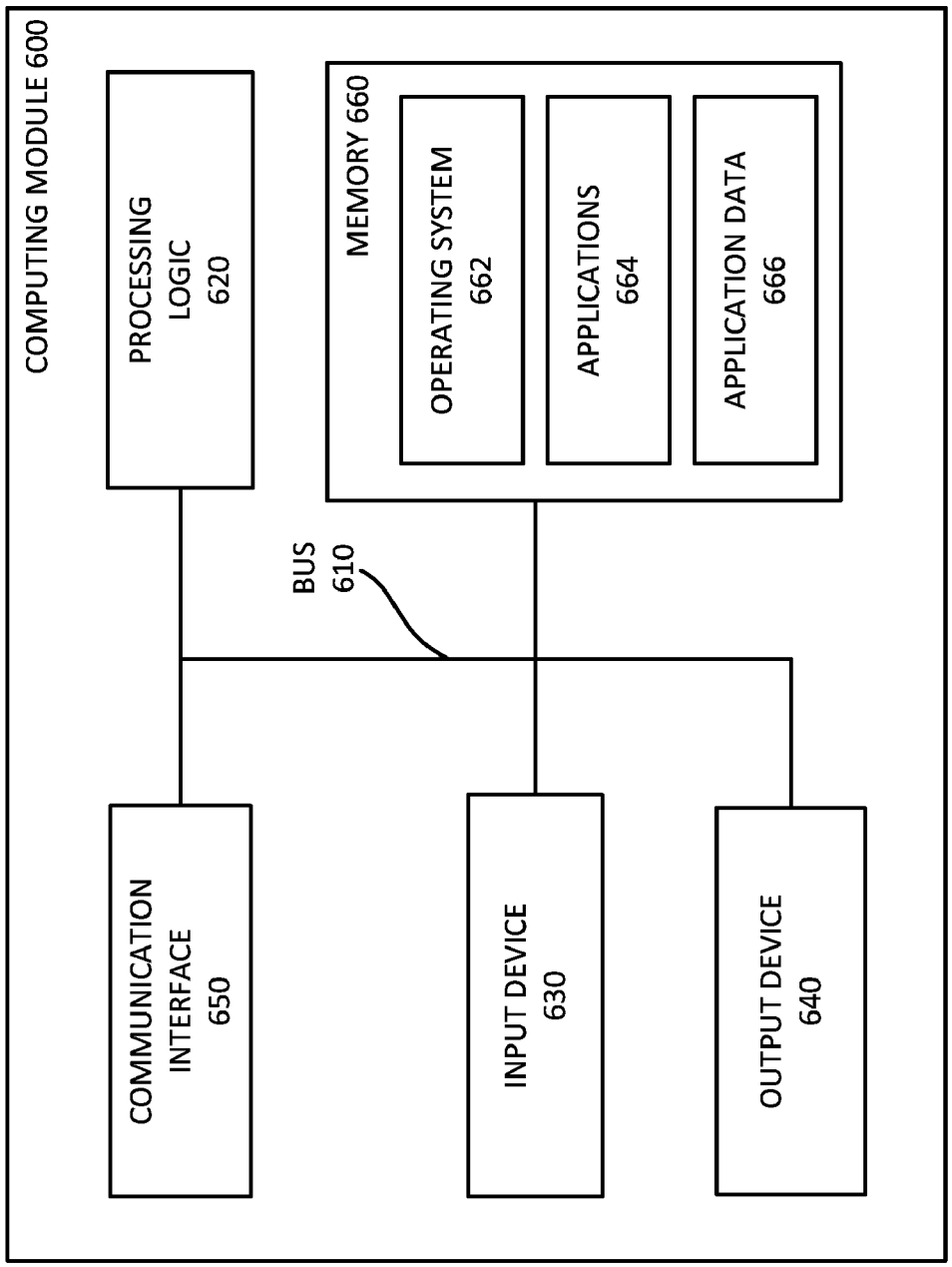
FIG. 6 is a block diagram of exemplary components of a computing module.

FIG. 6 is a block diagram of exemplary components of a computing module 600. Devices in network 100 may each include one or more computing modules 600. For example, DGD calculator 406 of test receiver 104A may include a computing module. Controllers 106 may also each include a computing module. Computing module 600 may include a bus 610, processing logic 620, an input device 630, an output device 640, a communication interface 650, and a memory 660. Computing module 600 may include other components (not shown) that aid in receiving, transmitting, and/or processing data. Moreover, other configurations of components in computing module 600 are possible.

Bus 610 may include a path that permits communication among the components of computing module 600. Processing logic 620 may include any type of processor or microprocessor (or families of processors or microprocessors) that interprets and executes instructions. In other embodiments, processing logic 620 may include an application-specific integrated circuit (ASIC), a field-programmable gate array (FPGA), or the like.

Input device 630 may allow a user to input information into computing module 600. Input device 630 may include a keyboard, a mouse, a pen, a microphone, a touch-screen display, etc. Output device 640 may output information to the user. Output device 640 may include a display, a printer, a speaker, etc. For example, controllers 106 may each include a display and ROADMS 108 may include light-emitting diodes (LEDs). Some devices may be managed remotely (e.g., "headless" devices) and may not include input device 630 or output device 640.

Input device 630 and output device 640 may allow the user to activate and interact with a particular service or application, such as an application to test an optical path, by test transmitter 102 and test receiver 104. Input device 630 and output device 640 may allow the user to receive and view a menu of options and select from the menu options. The menu may allow the user to select various functions or services associated with applications executed by computing module 600.

Communication interface 650 may include a transceiver that enables computing module 600 to communicate with other devices and/or systems. Communication interface 650 may include a transmitter that may convert baseband signals to radio frequency (RF) signals and/or a receiver that may convert RF signals to baseband signals. Communication interface 650 may be coupled to an antenna for transmitting and receiving RF signals. Communication interface 650 may include a network interface card, e.g., Ethernet card, for wired communications or a wireless network interface (e.g., a WiFi) card for wireless communications. Communication interface 650 may also include, for example, a universal serial bus (USB) port for communications over a cable, a Bluetooth™ wireless interface, etc.

Memory 660 may store, among other things, instructions (e.g., applications 664 and operating system (OS) 662) and data (e.g., application data 666). Memory 660 may include a random access memory (RAM) or another type of dynamic storage device that may store information and instructions; a read-only memory (ROM) device or another type of static storage device that may store static information and instructions for use by processing logic 620; and/or some other type of magnetic or optical recording medium and its corresponding drive, e.g., a hard disk drive (HDD), for storing information and/or instructions.

OS 662 may include software instructions for managing hardware and software resources of computing module 600. For example, OS 662 may include Linux, Windows, OS X, an embedded operating system, etc. Applications 664 and application data 666 may provide network services or include applications, depending on the device in which the particular computing module 600 is found.

Computing module 600 may perform the operations described herein in response to processing logic 620 executing software instructions contained in a computer-readable medium, such as memory 660. A computer-readable medium may include a physical or logical memory device. The software instructions may be read into memory 660 from another computer-readable medium or from another device via communication interface 650. The software instructions contained in memory 660 may cause processing logic 620 to perform processes that are described herein.

Figure 7:
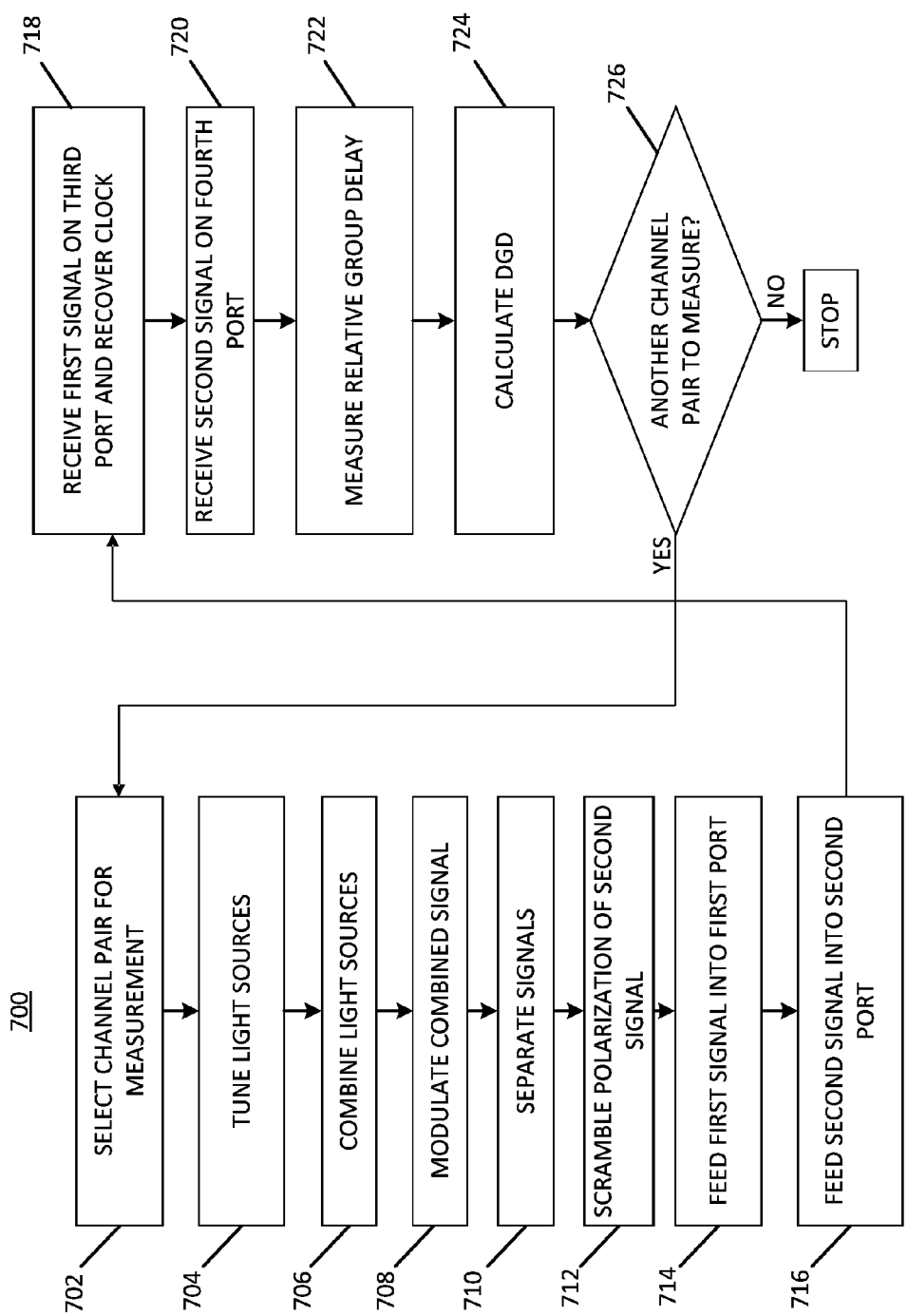
FIG. 7 is a flowchart of an exemplary process for determining the differential group delay and/or the polarization mode dispersion of an optical path.

FIG. 7 is a flowchart of an exemplary process 700 for determining PMD and/or DGD of an optical path. Process 700 is described with respect to FIG. 8, which is a block diagram of an exemplary network 800, which may include a deployed, in-service network.

Figure 8:
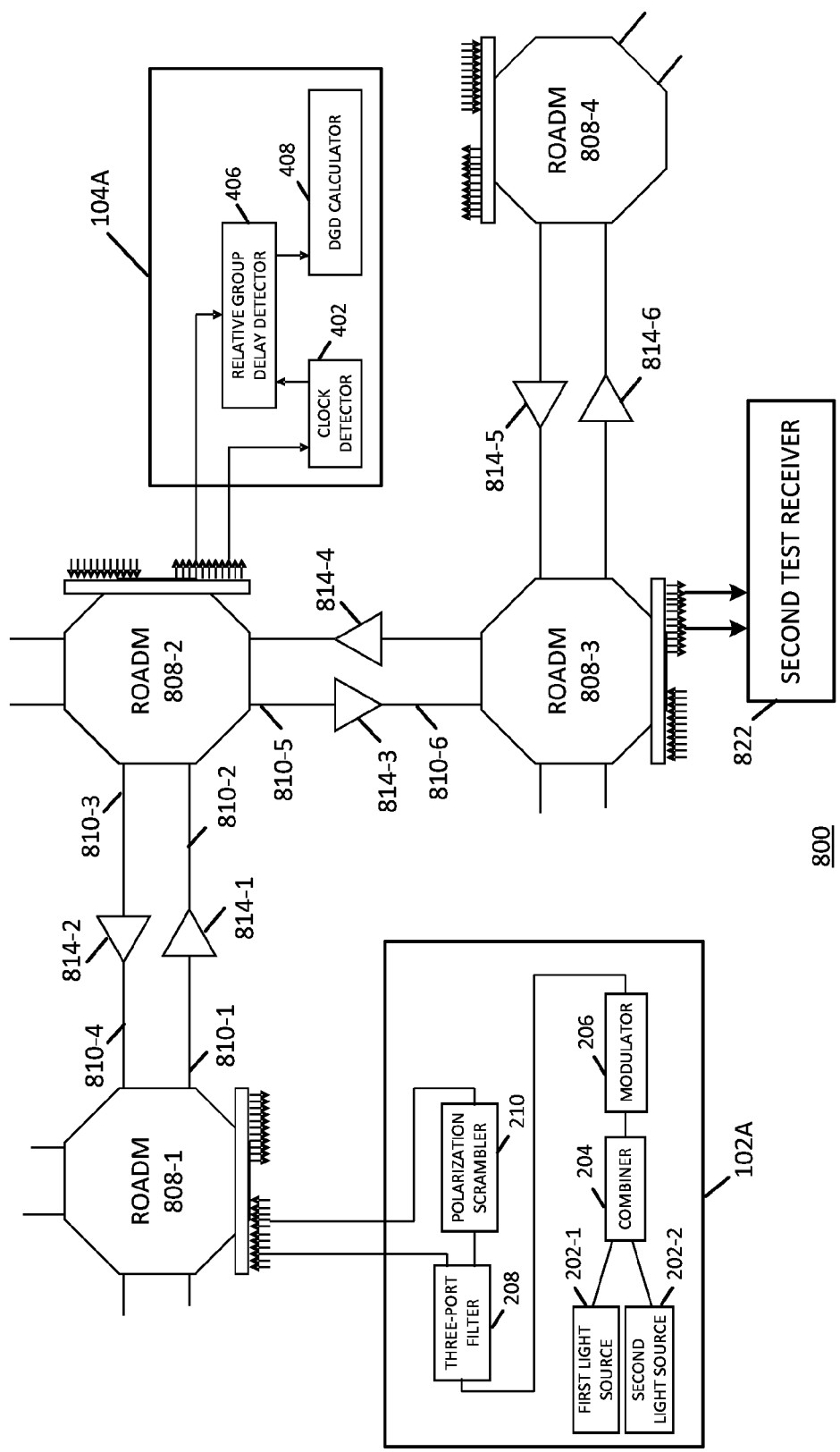
FIGS. 8 through 12 are block diagrams of exemplary networks in which embodiments disclosed herein may be employed.

Network 800 includes ROADMs 808-1 through 808-4 (collectively, "ROADMs 808"), amplifiers 814-1 through 814-6 (collectively "amplifiers 814"), optical fibers 810-1 through 810-6 (collectively, "optical fibers 810"), test transmitter 102A (shown in FIG. 2A), and test receiver 104A (shown in FIG. 4A). ROADMs 808, amplifiers 814, and optical fibers 810 may operate similarly to ROADMs 108, amplifiers 114, and optical fibers 110 described above with respect to FIG. 1. Exemplary network 800 may include more, fewer, or different devices than shown. For example, network 800 may include hundreds or thousands of NEs, fibers, ROADMs, amplifiers, and/or switches. Further, although FIG. 8 shows devices in a particular configuration, they may also be arranged in other configurations.

Process 700 may test the optical path between test transmitter 102A and test receiver 104A, which includes ROADMs 808-1 and 808-2, optical fibers 810-1 and 810-2, and amplifier 814-1. Process 700 may begin with the selection of a channel pair for measurement (block 702). For example, two input channels to ROADM 808-1, each associated with a different wavelength, may be selected.

The light sources may be tuned (block 704). For example, referring to FIG. 2A, first light source 202-1 may be tuned to the wavelength associated with the first channel of the selected channel pair. Second light source 202-2 may be tuned to the wavelength associated with the second channel of the selected channel pair. First light source 202-1 and second light source 202-1 may output the first and second signal on a first and second fiber, respectively.

The light sources may be combined (block 706). In the current example, combiner 204 may receive the light from first light source 202-1 and the light from second light source 202-2 and may combine the light into a single fiber, for example. Combiner 204 may output the combined signal on a single optical fiber.

The combined signal may be modulated (block 708). Modulator 206 may input the combined signal and may modulate the combined signal to generate two synchronized signals (e.g., two optical clock signals, one at the first wavelength and one at the second wavelength). In this embodiment, because modulator 206 operates on both the first and second wavelength simultaneously, the two signals are synchronized.

The signals may be separated (block 710). For example, three-port filter 208 may receive the two synchronized signals (e.g., the first and second wavelength on a single fiber) and may output the first signal (e.g., the first wavelength) to a port of ROADM 808-1 corresponding to the appropriate wavelength. Three-port filter 208 may also output the second signal (e.g., the second wavelength) to polarization scrambler 210.

The polarization of one of the signals (e.g., the second signal) may be scrambled (block 712). For example, polarization scrambler 210 may change or vary the polarization of the second signal. In one embodiment, polarization scrambler 210 may cycle through up to 8,000 polarizations over a period of time. Other quantities of polarizations are possible. For example, polarization scrambler 210 may cycle through up to 1,000, 3,000, 5,000, 7,000, 9,000, 11,000, etc., polarizations.

The first signal may be fed into the first port (block 714). As discussed above, three-port filter 208 may output the first signal (e.g., the first wavelength without scrambled polarization) to a port of ROADM 808-1 that corresponds to the appropriate wavelength. The second signal may be fed into the second port (block 716). Polarization scrambler 210 may output the second signal (e.g., the second wavelength with scrambled polarization) to a port of ROADM 808-1 corresponding to the appropriate wavelength.

The first and second signals (at the first and second wavelengths) traverse the optical path. The first signal may be received on a third port and a clock may be recovered (block 718). Referring to FIG. 4A, clock detector 402 may detect the clock superimposed on (e.g., carried by) the first signal at the first wavelength (e.g., without scrambled polarization). Clock detector 402 may output the detected clock as a clock signal 410 to RGD detector 404. The second signal may be received on a fourth port (block 718) and fed into, for example, RGD detector 404.

The relative group delay may be measured (block 722). RGD detector 404 measures the delay between clock signal 410 output from clock detector 402 and the recovered second signal (e.g., the signal with the scrambled polarization). Relative group delay detector 404 may measure the relative delay once every polarization time increment, for example. As shown in FIG. 5A, for example, recovered second signal 502 is delayed by delay time T1 relative to recovered clock signal 410. In this example, RGD detector 404 may output delay time T1 to DGD calculator 406. RGD detector 404 may measure the relative delay over a period of time such that polarization scrambler 210 cycles once through all polarizations for measurement. RGD detector 404 may output the measured delays as they are measured or as a group of delays.

The differential group delay (DGD) may be measured (block 724). For example, DGD calculator 406 may receive the measured delays from RGD detector 404. DGD calculator 406 may determine the minimum and maximum delay times output from RGD detector 404. As discussed above with respect to FIG. 5B, DGD calculator 406 may determine the maximum delay value and the maximum delay value. In one embodiment, DGD calculator 406 calculates DGD by subtracting the maximum delay time from the minimum delay time. In the example of FIG. 5B, discussed above, DGD calculator 406 may calculate DGD by subtracting minimum delay time T2 from maximum delay time T3.

As discussed above, if there is PMD and/or DGD in the optical path, then the arrival time of the second signal (e.g., with scrambled polarization) may exhibit a different delay relative to the first signal (e.g., without scrambled polarization) when the polarization of the second signal changes. In this case, DGD calculator 406 may output the difference between the minimum and maximum delay time as the calculated DGD. If there is no PMD and/or DGD in the measured optical path, then the arrival time of the second signal (e.g., with scrambled polarization) relative to the first signal (e.g., without scrambled polarization) does not change when the polarization of the second signal changes. In this case, the minimum and maximum delay time are the same, and the difference is zero (e.g., the DGD value is calculated to be zero).

If another channel pair is to be measured (block 726: YES), then another channel pair may be selected (block 702). For example, test transmitter 102A in FIG. 8 may choose to test the optical path from test transmitter 102A to second test receiver 822, including ROADMs 808-1 through 808-3, amplifiers 814-1 and 814-3, and optical fibers 810-1, 810-2, 810-5, and 810-6. In this case, process 700 may begin again at block 702. If there are no other channel pairs to measure (block 726: NO), then process 700 may end.

Figure 9:
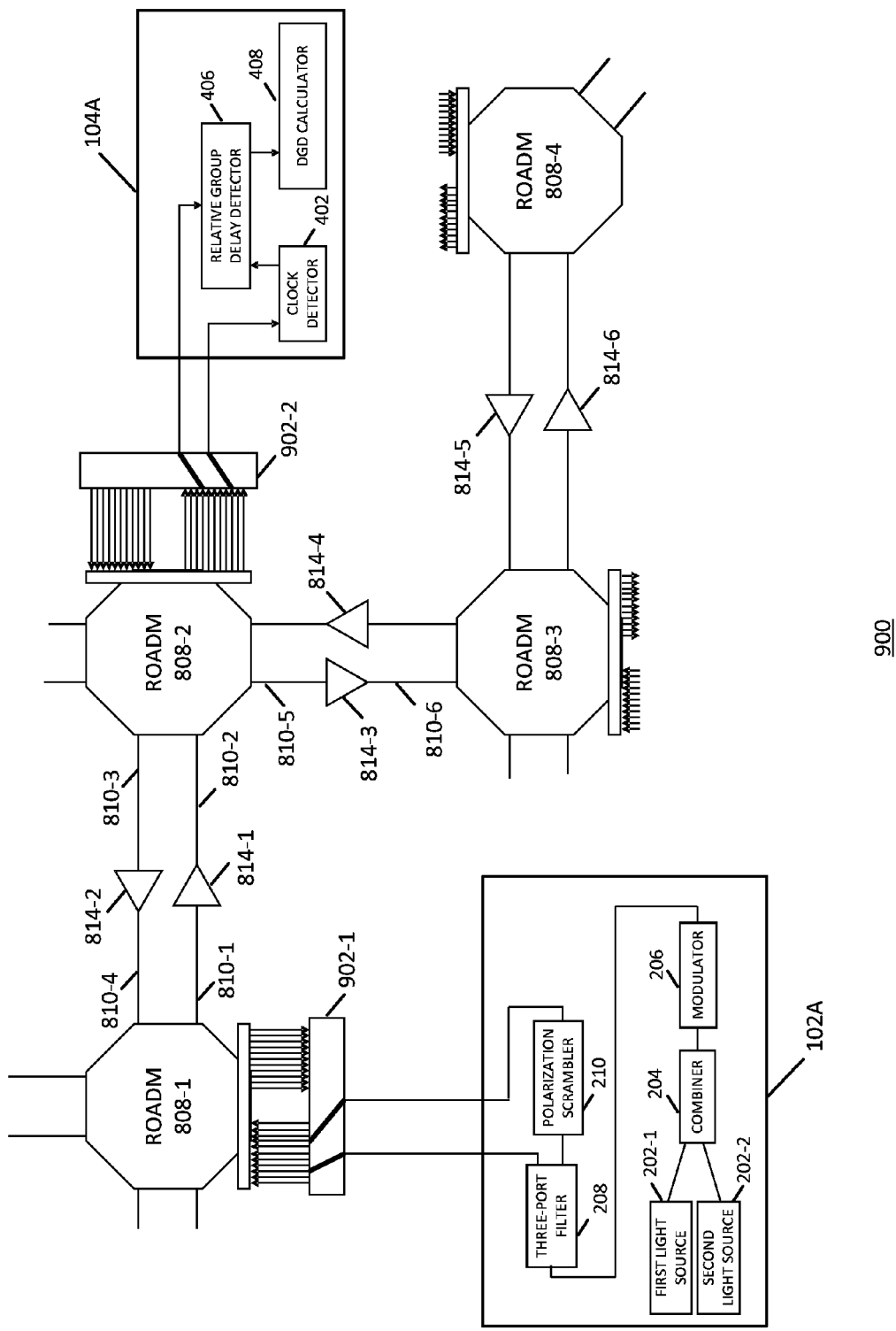

FIG. 9 is a block diagram of an exemplary network 900 including optical switches. Like network 800, network 900 may include a deployed, in-service network. Network 900 includes some of the same components of network 800, including ROADMs 808, fibers 810, amplifiers 814, test transmitter 102A, and test receiver 104A. Network 900 also includes switches 902-1 and 902-2 (collectively, "switches 902"). Switches 902 may allow wavelength steering, e.g., passing one wavelength from one fiber span to a different wavelength on another fiber span, independently of other wavelengths and without electrical conversion, for example. Switches 902 may allow for more flexibility in testing optical paths. In one embodiment, switches 902 may be considered part of test transmitter 102 and test receiver 104.

For example, returning to process 700, tuning light sources (block 704) may include tuning first light source 202-1 and second light source 202-2 to two pre-set wavelengths. In this embodiment, feeding the first signal into the first port (block 714) may include switch 902-1 steering the first signal (at the first wavelength) to the correct port (with the corresponding wavelength) in ROADM 808-1. Likewise, in this embodiment, feeding the second signal into the second port (block 716) may include switch 902-1 steering the second signal (at the second wavelength) to the correct port (with the corresponding wavelength) in ROADM 808-1. This embodiment may allow switching between ports (block 726) in ROADM 808-1 (e.g., to test different optical paths) without having to retune light sources 202.

Figure 10:
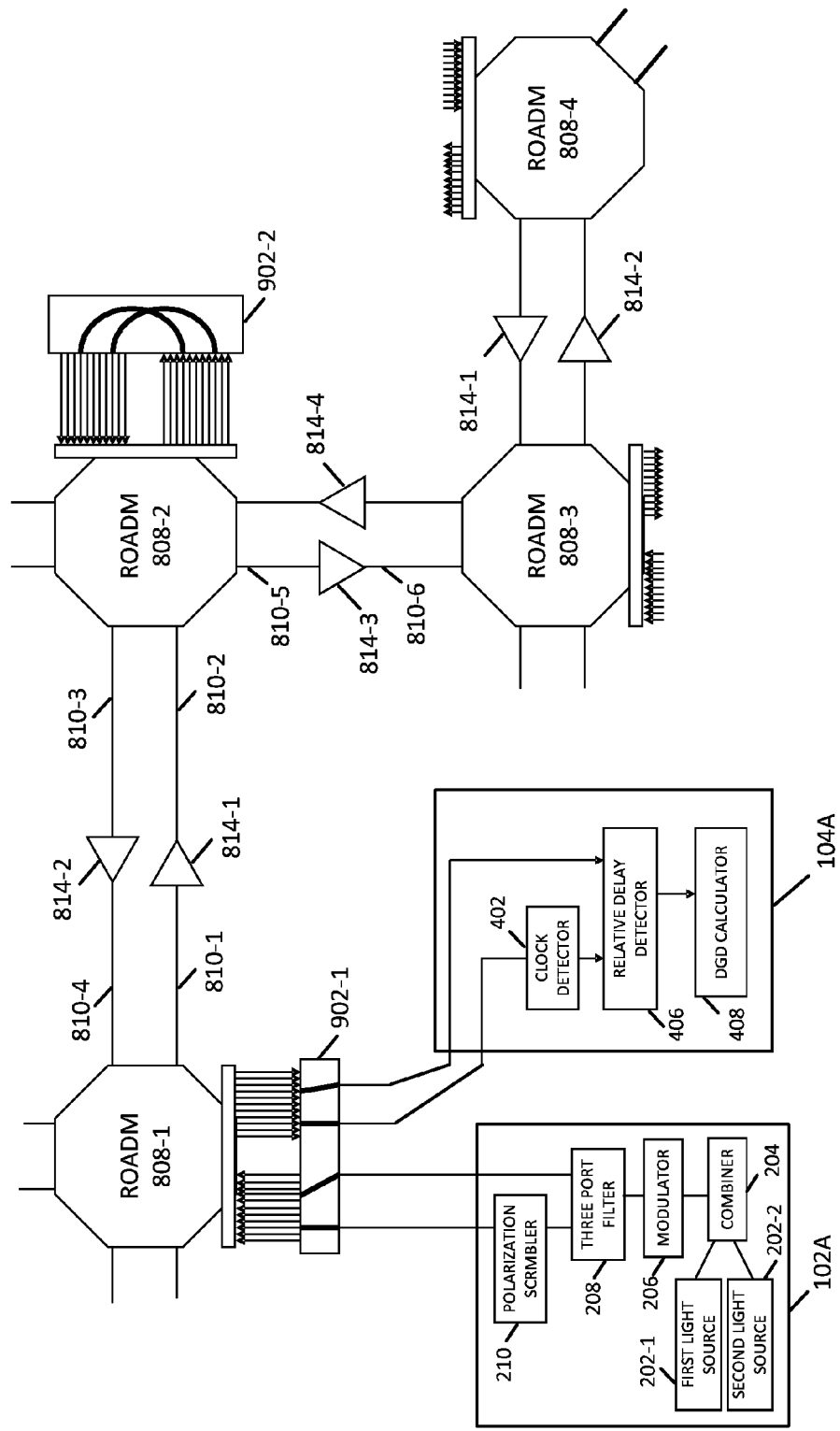

FIG. 10 is a block diagram of an exemplary network 1000 including a test transmitter and a test receiver at the same ROADM 808. Like network 900, network 1000 may include a deployed, in-service network. Also, like network 900, network 1000 may include some of the same components of network 800, with the addition of switches 902. In FIG. 10, however, switch 902-2 is configured to send the two signals at the two wavelengths back to ROADM 808-1 (passing a second time through ROADM 808-2). That is, network 1000 is in a "loop-back" configuration while networks 900 and 800 are in a "linear" configuration. Thus, test transmitter 102A and test receiver 104A, in this configuration, may be located at ROADM 808-1. The configuration of network 1000 may be more convenient than the test configuration in network 900 if test transmitter 102A and 104A are already collocated, if they are physically attached to one another, of if they form part of ROADM 808-1 and/or switch 902-1.

Returning to process 700, in the configuration of network 1000, feeding the first signal into the first port (block 714) may include switching the first signal to a port in ROADM 808-2 to return the first signal to originating ROADM 808-1. Likewise, feeding the second signal into the second port (block 716) may include switching the second signal to a port in ROADM 808-2 to return the second signal to originating ROADM 808-1. In the configuration of network 1000, the tested optical path includes fibers 810-3 and 810-4 and amplifiers 814-1 and 814-2.

As mentioned, network 1000 allows for test transmitter 102A and test receiver 104A to be at the same physical location. In one embodiment, however, in networks 800 and 900, test transmitter 102A and test receiver 104A, while located separately, may function without communicating with each other if configured properly.

Figure 11:
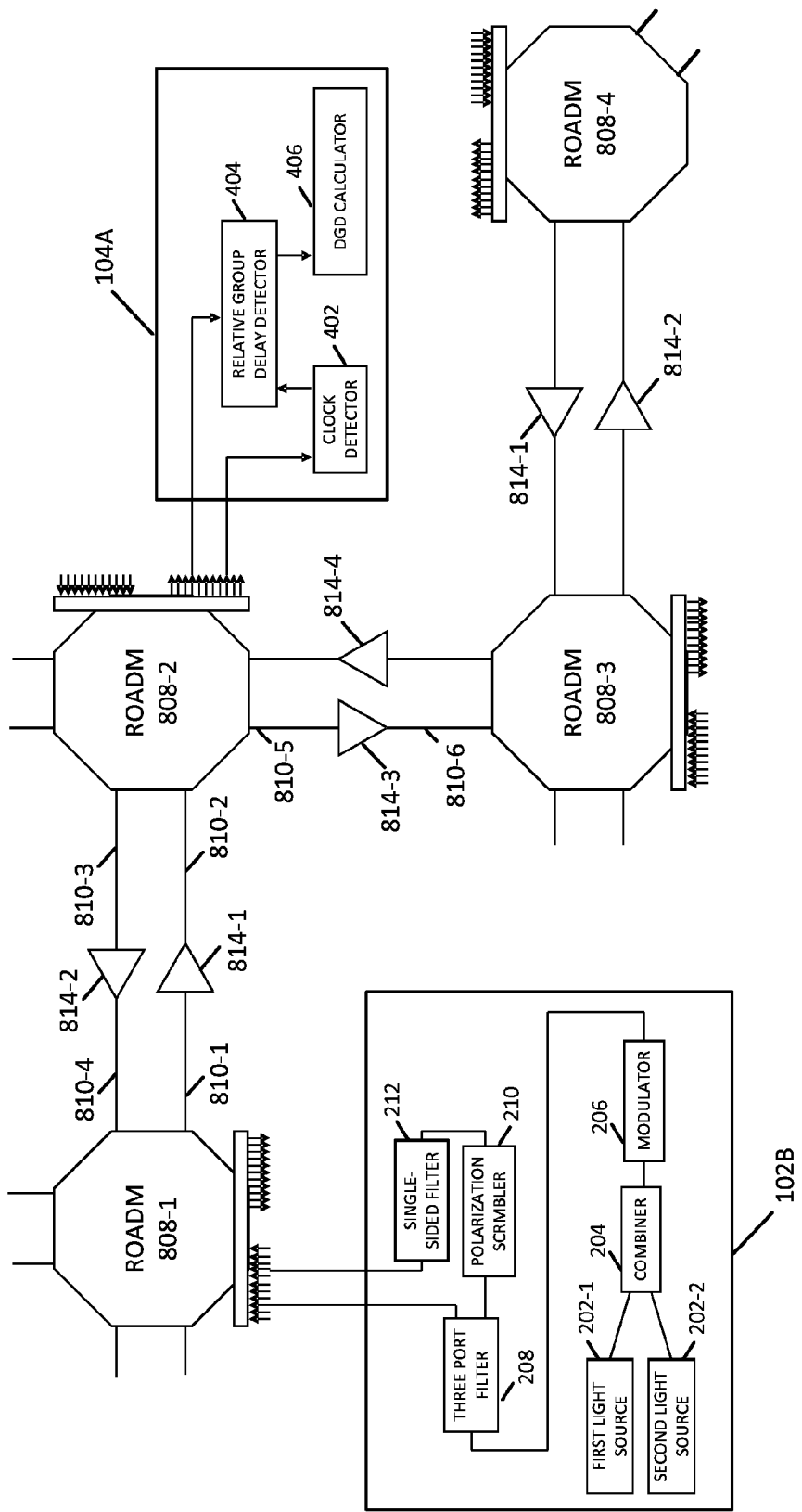

FIG. 11 is a block diagram of an exemplary network 1100 including single-sided filter 212 in test transmitter 102B. Like network 800, network 1100 may include a deployed, in-service network. Also, like network 800, network 1100 may include some of the same components of network 800, including ROADMs 808, amplifiers 814, fibers 810, and test receiver 104A. Network 1100, however, includes test transmitter 102B rather than test transmitter 102A.

As discussed above with respect to FIG. 2B, test transmitter 102B may include single-sided filter 212 at the output of polarization scrambler 210. In this embodiment, as shown in FIG. 3C, single-sided filter 212 passes only one sideband of the modulated signal, which may help remove the effects of chromatic dispersion when recovering the second signal.

Returning to process 700, in the configuration of network 1100, feeding the second signal into the second port (block 716) may include first filtering the second signal with single-sided filter 212. In this embodiment, test receiver 104A does not include a single sided filter because frequencies other than the single sideband were already filtered out by single-sided filter 212.

Figure 12:
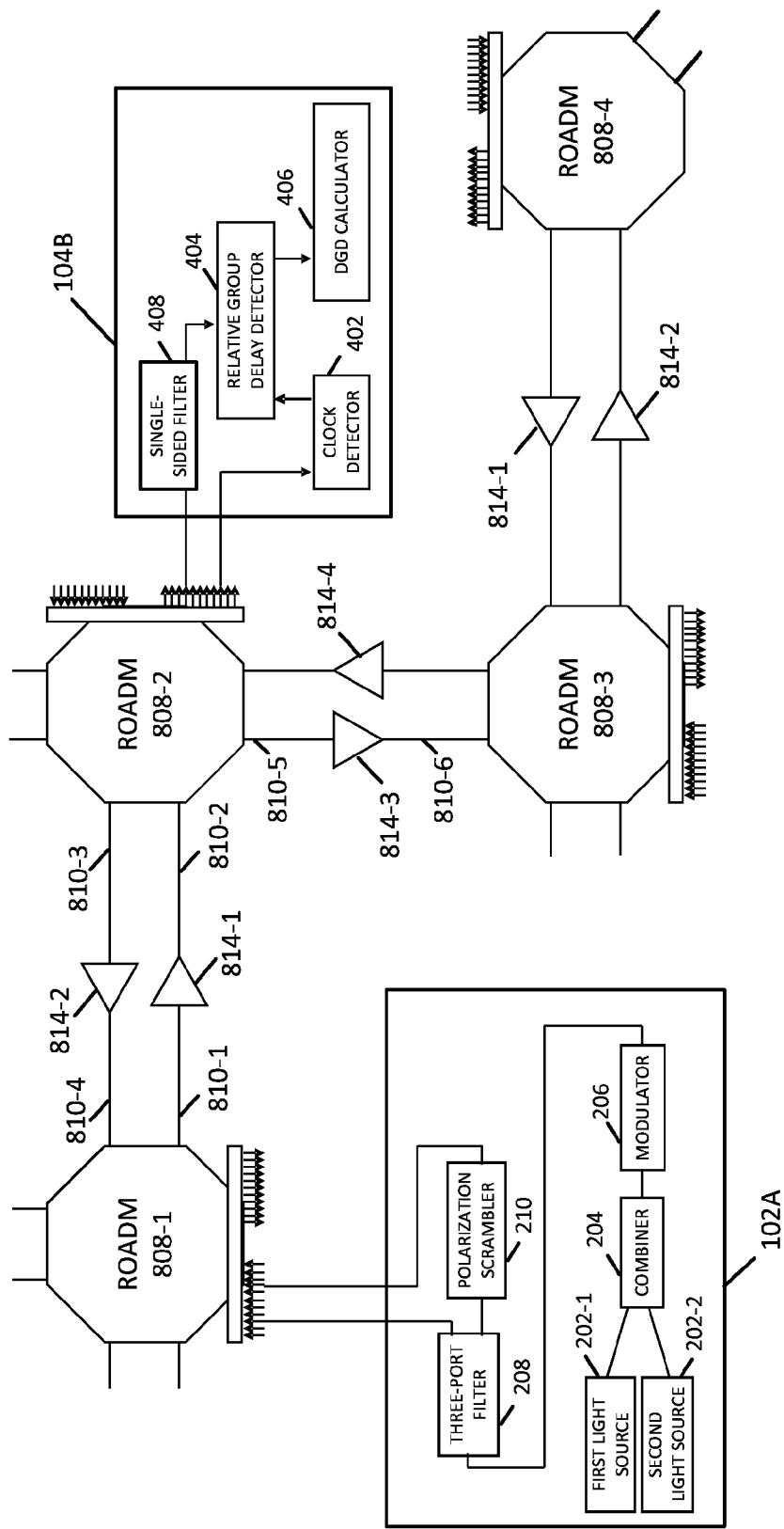

FIG. 12 is a block diagram of an exemplary network 1200 including a single-sided filter in test receiver 104B. Like network 800, network 1200 may include a deployed, in-service network. Also, like network 800, network 1100 may include some of the same components of network 800, including ROADMs 808, amplifiers 814, fibers 810, and test transmitter 102A. Network 1100, however, includes test receiver 104B rather than test receiver 104A.

In this embodiment, single-sided filter 408 may be added to the input of test receiver 104B. In this embodiment, single-sided filter 408 may pass only one sideband of the modulated signal, which may help reduce the effects of chromatic dispersion when recovering the second signal.

Returning to process 700, in the configuration of network 1200, receiving the second signal on the fourth port (block 720) may include filtering the second signal with single-sided filter 408. In this embodiment, test transmitter 102A does not include a single sided filter because frequencies other than the single sideband are filtered out by single-sided filter 408.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Although embodiments described above include deployed, in-service networks, embodiments may also allow for the measurement of PMD and/or DGD in "dark fiber" or out-of-service networks. Embodiments described herein may allow for the accurate measurement of PMD and/or DGD in a timely manner.

In addition, FIGS. 2A and 2B disclose modulator 206 acting on two wavelengths simultaneously in a single fiber after combiner 204 combines signals from first light source 202-1 and second light source 202-2. In another embodiment, two modulators may act on the two wavelengths separately (e.g., in separate fibers) without combiner 204 combining the two wavelengths. In this embodiment, the modulators are synchronized themselves so as to create two well synchronized signals.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A system comprising:
a receiver to receive a first optical signal from a first channel associated with a first wavelength and a second optical signal from a second channel associated with a second wavelength,
wherein the first optical signal and the second optical signal traveled along a same optical path, wherein the first optical signal and the second optical signal are synchronized, and wherein the second optical signal includes varying polarization;
a detector to determine a plurality of differential travel delays between the first optical signal and the second optical signal over a period of varying polarizations of the second optical signal, wherein the plurality of differential travel delays include a maximum differential travel delay and a minimum differential travel delay; and
a processor to determine a differential group delay based on the maximum differential travel delay and the minimum differential travel delay.

2. The system of claim 1, further comprising:
a transmitter to transmit the first optical signal and the second optical signal; and
a polarization scrambler to vary the polarization of the second optical signal.

3. The system of claim 2, further comprising:
a first light source to generate the first optical signal;
a second light source to generate the second optical signal; and
a modulator to modulate the first optical signal and the second optical signal simultaneously to synchronize the first optical signal and the second optical signal.

4. The system of claim 3, further comprising:
a combiner to combine the first optical signal and the second optical signal, wherein the modulator modulates the combined signal.

5. The system of claim 3, further comprising:
a filter to pass a first sideband of the second optical signal and to filter a second sideband of the second optical signal.

6. The system of claim 3, wherein the modulator modulates a clock signal on the first optical signal and a clock signal on the second optical signal.

7. The system of claim 6, further comprising:
a clock recovery circuit to recover the clock signal carried by the first optical signal;
wherein the detector determines the plurality of differential travel delays based on the recovered clock signal and the second optical signal.

8. A method comprising:
receiving a first optical signal from a first channel associated with a first wavelength;
receiving a second optical signal from a second channel associated with a second wavelength, wherein the first optical signal and the second optical signal traveled along a same optical path, wherein the first optical signal and the second optical signal are synchronized, and wherein the second optical signal includes varying polarization;
detecting a plurality of differential travel delays between the first optical signal and the second optical signal over a period of varying polarizations of the second optical signal, wherein the plurality of differential travel delays includes a maximum differential travel delay and a minimum differential travel delay; and
determining a differential group delay based on the maximum differential travel delay and the minimum differential travel delay.

9. The method of claim 8, further comprising:
transmitting the first optical signal and the second optical signal; and
varying the polarization of the second optical signal.

10. The method of claim 9, further comprising:
generating the first optical signal with a first light source;
generating the first optical signal with a second light source; and
modulating the first optical signal and the second optical signal simultaneously to synchronize the first optical signal and the second optical signal.

11. The method of claim 10, further comprising:
combining the first optical signal and the second optical signal, wherein modulating includes modulating the combined signal.

12. The method of claim 10, further comprising:
filtering a sideband of the second optical signal.

13. The method of claim 10, wherein modulating includes imposing a clock signal on the first optical signal and a clock signal on the second optical signal.

14. The method of claim 13, further comprising:
recovering the clock signal from the first optical signal, wherein determining the differential group delay includes determining the differential group delay based on the recovered clock signal and the second optical signal.

15. A system comprising:
a first light source to generate a first optical signal at a first wavelength;
a second light source to generate a second optical signal at a second wavelength different than the first wavelength;
a modulator to modulate the first optical signal and the second optical signal simultaneously to synchronize the first optical signal and the second optical signal;
a polarization scrambler to vary the polarization of the second optical signal; and
a transmitter to transmit the first optical signal and the second optical signal.

16. The system of claim 15, further comprising:
a receiver to receive the first optical signal and the second optical signal, wherein the first optical signal and the second optical signal traveled along a same optical path;
a combiner to combine the first optical signal and the second optical signal, wherein the modulator modulates the combined signal, and wherein the modulator modulates a clock signal on the first optical signal and the second optical signal;
a detector to determine a plurality of differential travel delays between the first optical signal and the second optical signal over a period of varying polarizations of the second optical signal, wherein the plurality of differential travel delays includes a maximum differential travel delay and a minimum differential travel delay; and
a processor to determine a differential group delay based on the maximum differential travel delay and the minimum differential travel delay.

17. The system of claim 16, further comprising:
a clock recovery circuit to recover the clock signal from the first optical signal, wherein the detector determines the plurality of differential travel delays based on the recovered clock signal and the second optical signal.

18. The system of claim 16, further comprising:
a filter to pass a first sideband of the second optical signal and to filter a second sideband of the second optical signal.

19. A method comprising:
generating a first optical signal at a first wavelength;
generating a second optical signal at a second wavelength different than the first wavelength;
modulating the first optical signal and the second optical signal simultaneously to synchronize the first optical signal and the second optical signal;
varying the polarization of the second optical signal; and
transmitting the first optical signal and the second optical signal.

20. The method of claim 19, further comprising:
combining the first optical signal and the second optical signal into a combined signal, wherein the modulating includes modulating the combined signal, and wherein the modulating includes modulating a clock signal on the first optical signal and a clock signal on the second optical signal;
receiving the first optical signal and the second optical signal, wherein the first optical signal and the second optical signal traveled along a same optical path;
determining a plurality of differential travel delays between the first optical signal and the second optical signal over a period of varying polarizations of the second optical signal, wherein the plurality of differential travel delays includes a maximum differential travel delay and a minimum differential travel delay; and
determining a differential group delay based on the maximum differential travel delay and the minimum differential travel delay.

21. The method of claim 19, further comprising:
recovering the clock signal carried by the first optical signal, wherein determining includes determining the plurality of differential travel delays based on the recovered clock signal and the second optical signal.

22. The method of claim 19, further comprising:
filtering a sideband of the second optical signal.

* * * * *